United States Patent [19]

Sakata

[11] Patent Number: 4,703,429
[45] Date of Patent: Oct. 27, 1987

[54] SYSTEM AND METHOD FOR CONTROLLING A VEHICLE SPEED OF AN AUTOMOTIVE VEHICLE

[75] Inventor: Masao Sakata, Yokosuka, Japan

[73] Assignee: Nissan Motor Company, Limited, Kanagawa, Japan

[21] Appl. No.: 756,882

[22] Filed: Jul. 19, 1985

[30] Foreign Application Priority Data

Jul. 20, 1984 [JP] Japan ................. 59-149590

[51] Int. Cl.$^4$ ............................. G06F 15/50
[52] U.S. Cl. ..................... 364/426; 364/456; 364/461; 340/903; 180/169; 180/170; 342/70; 342/455
[58] Field of Search ............... 364/424, 426, 460, 461, 364/456; 340/901–904; 180/167, 169, 170, 179; 342/70, 455

[56] References Cited

U.S. PATENT DOCUMENTS

| | | | |
|---|---|---|---|
| 4,072,945 | 2/1978 | Katsumata et al. | 342/70 |
| 4,101,888 | 7/1978 | Heller et al. | 342/70 |
| 4,148,028 | 4/1979 | Fujiki | 342/70 |
| 4,165,511 | 8/1979 | Wocher et al. | 342/70 |
| 4,519,469 | 5/1985 | Hayashi et al. | 342/70 |
| 4,543,577 | 9/1985 | Tachibana et al. | 340/904 |
| 4,621,705 | 11/1986 | Etoh | 180/169 |
| 4,622,636 | 11/1986 | Tachibana | 342/70 |

Primary Examiner—Gary Chin
Attorney, Agent, or Firm—Schwartz, Jeffery, Schwaab, Mack, Blumenthal & Evans

[57] ABSTRACT

A system and method for controlling a vehicle speed to follow a preceding vehicle moving on the same traffic lane of a road as the vehicle. The system comprises: means for transmitting electromagnetic waves toward a vehicle movement direction, receiving the reflected waves from a reflecting object, measuring a distance to the reflecting object on the basis of a propagation delay time on the transmitted and reflected wave, and outputting respective Doppler signals derived from a relative movement of the reflecting object to the vehicle; means for calculating a change rate of the phase difference between the Doppler signals with respect to the measured distance; means for determining whether the reflecting object is the preceding vehicle on the basis of a magnitude of the differentiated phase difference with respect to a reference value associated with the distance and set according a radius of curvature of the traffic lane on which the vehicle moves; and means for controlling the vehicle speed so as to follow the preceding vehicle at a safe intervehicle distance on the basis of the vehicle speed and measured distance.

11 Claims, 12 Drawing Figures

FIG.4

| D \ R | ∞ | | | 3000 (m) | | | --- | | 300 (m) | | |
|---|---|---|---|---|---|---|---|---|---|---|
| | ai | bi | ci | | | | | | | |
| 10 (m) | 0 | 60 | — | | | | | | | |
| 12 (m) | 0 | 56 | — | | | | | | | |
| 14 (m) | 0 | 51 | — | | | | | | | |
| ⋮ | ⋮ | ⋮ | ⋮ | ⋮ | ⋮ | ⋮ | ⋮ | ⋮ | ⋮ | ⋮ |
| 48 (m) | 0 | 17 | — | | | | | | | |
| 50 (m) | 0 | 16 | 17 | | | | | | | |
| 52 (m) | 0 | 14 | 16 | | | | | | | |
| ⋮ | ⋮ | ⋮ | ⋮ | ⋮ | ⋮ | ⋮ | ⋮ | ⋮ | ⋮ | ⋮ |
| 96 (m) | 0 | 4.5 | 7 | | | | | | | |
| 98 (m) | 0 | 4.5 | 7 | | | | | | | |
| 100 (m) | 0 | 4 | 7 | | | | | | | |

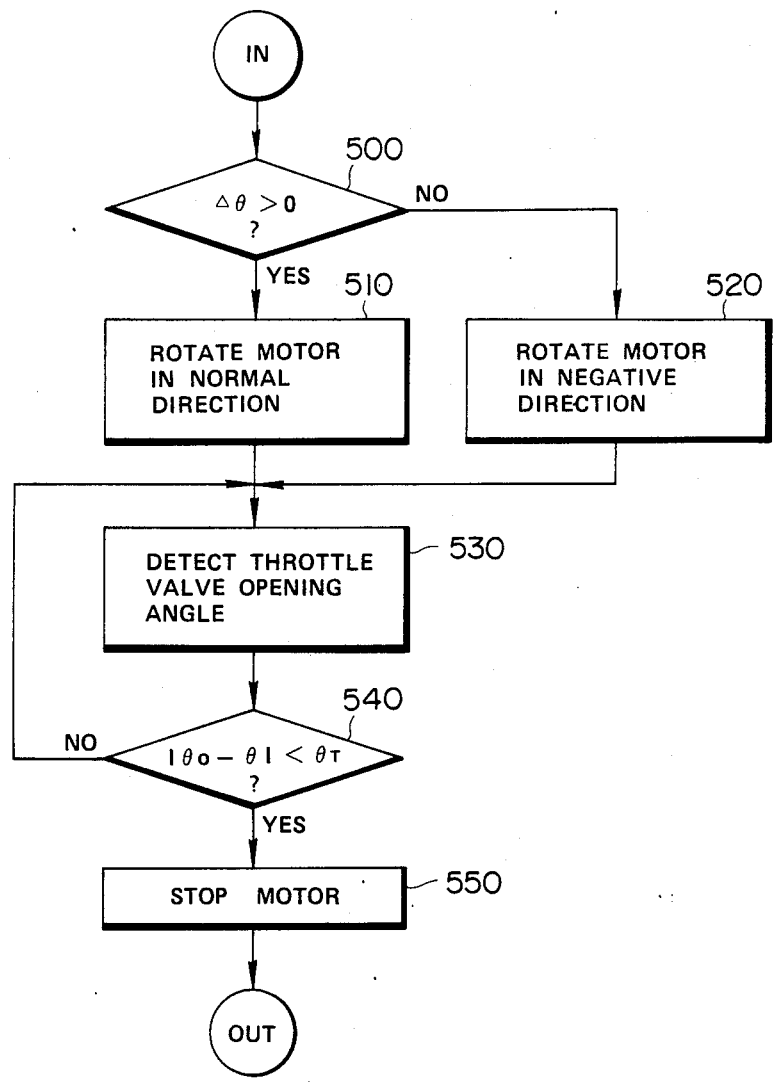

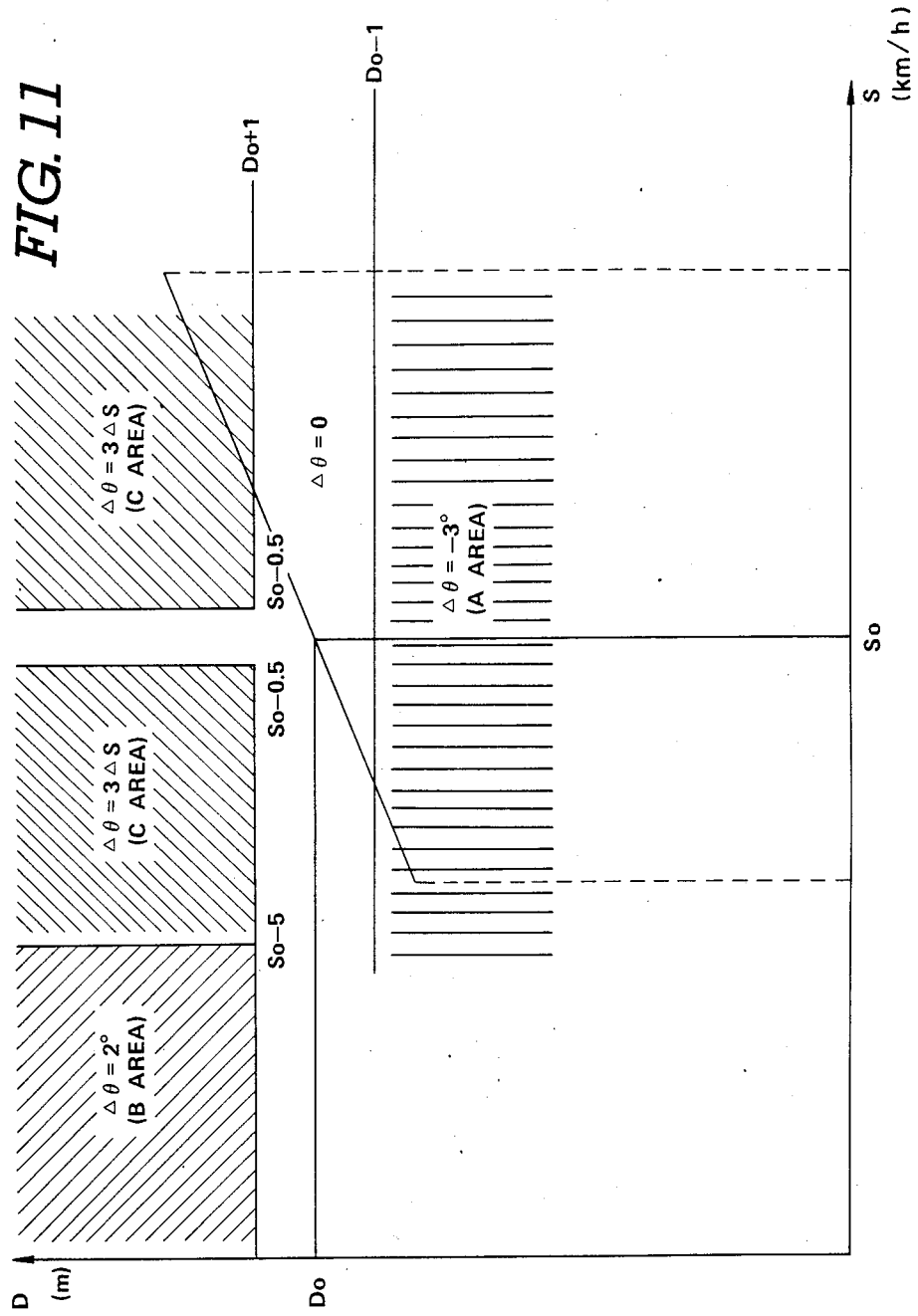

SYSTEM AND METHOD FOR CONTROLLING A VEHICLE SPEED OF AN AUTOMOTIVE VEHICLE

BACKGROUND OF THE INVENTION

1. Field of the Invention

The present invention relates to a system and method for controlling a vehicle speed of an automotive vehicle to follow a preceding vehicle moving on the same traffic lane as the vehicle, wherein an intervehicle distance to the preceding vehicle is measured and the vehicle speed is so controlled that the vehicle automatically follows the preceding vehicle at a safe intervehicle distance on the basis of the measured intervehicle distance and current vehicle speed.

2. Description of the Prior Art

Recently, automatic cruising control systems have been installed on some vehicles to move the vehicles at constant set vehicle speeds. In addition, various automatic vehicle speed control systems associated with the cruising control systems have been proposed in which a distance from the vehicle to a moving object such as another vehicle (hereinafter referred to as an intervehicle distance) which is moving in front of the vehicle is measured and a vehicle speed is so controlled on the basis of the measured intervehicle distance as to automatically follow the other vehicle at a safe intervehicle distance in order to prevent collision on the preceding vehicle and thus improving driving comfortability.

Such systems as described above are exemplified by Janpanese Patent Application Unexamined Open No. Sho 55-86,000 published on June 28, 1980.

In the above-identified document, the system measures the intervehicle distance to the other vehicle which is moving in front of the vehicle and controls the vehicle speed on the basis of the measured result.

Hence, to achieve an appropriate vehicle speed control it is necessary to detect accurately the presence of the other vehicle moving in front of the vehicle on the same traffic lane as the vehicle (hereinafter referred to as a preceding vehicle).

In the system disclosed in the above-identified document, a radar unit is used as means for monitoring the presence of the preceding vehicle and measuring the intervehicle distance to the preceding vehicle.

However, since an electromagnetic wave used as a measuring medium of the radar unit has a high linear directivity, a detection area of the radar unit is limited substantially in a narrow forward movement direction of the vehicle. Hence, if the vehicle is moved on a curved road having a certain radius of curvature, the radar unit may erroneously recognize the presence of another vehicle moving on an adjacent traffic lane to the lane on which the vehicle moves as the preceding vehicle moving on the same traffic lane. Consequently, the appropriate control of the vehicle speed cannot be achieved due to an erroneous control based on an incorrect measured result of the intervehicle distance.

SUMMARY OF THE INVENTION

With the above-described problem in mind, it is an object of the present invention to provide a system and method for controlling a vehicle speed to automatically follow a preceding vehicle at a safe intervehicle distance which prevents the occurence of vehicle following another forwarding vehicle which is not the preceding vehicle moving on the same lane.

This can be achieved by providing a system for controlling a vehicle speed of an automotive vehicle, comprising: (a) first means for monitoring the presence of an object moving relatively to the vehicle, measuring a distance from the vehicle to the moving object, and outputting Doppler signals having different directivities and based on a movement of the moving object relative to the vehicle, (b) second means for calculating a change rate of a phase difference between the Doppler signals derived from the first means with respect to the distance measured by the first means, (c) third means for determining a radius of curvature of a traffic lane on which the vehicle moves, (d) fourth means for determining whether the moving object is another vehicle moving on the same traffic lane as the vehicle on the basis of a magnitude of the change rate of the phase difference value derived from the third means with respect to a reference value associated with the distance measured by the first means and set according to the radius of curvature of the traffic lane determined by the third means, and (e) fifth means for detecting and controlling the vehicle speed so as to follow the other vehicle moving on the same traffic lane at a predetermined safe intervehicle distance to the other vehicle on the basic of the detected vehicle speed and distance by the first means when the fourth means determines that the moving object is the other vehicle moving on the same traffic lane.

BRIEF DESCRIPTION OF THE DRAWINGS

A more complete understanding of the present invention may be obtained from the following detailed description taken in conjunction with the attached drawings in which like reference numerals designate corresponding elements and in which:

FIGS. 3 through 7 are explanatory views for explaining a theory of detection of a preceding vehicle in the embodiment shown in FIGS. 1 and 2;

FIG. 10 is an operation flowchart for controlling a throttle valve opening angle in a step 420 shown in FIG. 9(B) of the system shown in FIG. 1: and FIG. 11 is an explanatory view for explaining the vehicle speed control operation of the system shown in FIG. 1.

DETAILED DESCRIPTION OF THE PREFERRED EMBODIMENT

Reference will hereinafter be made to the drawings in order to facilitate understanding of the present invention.

Figure 1:
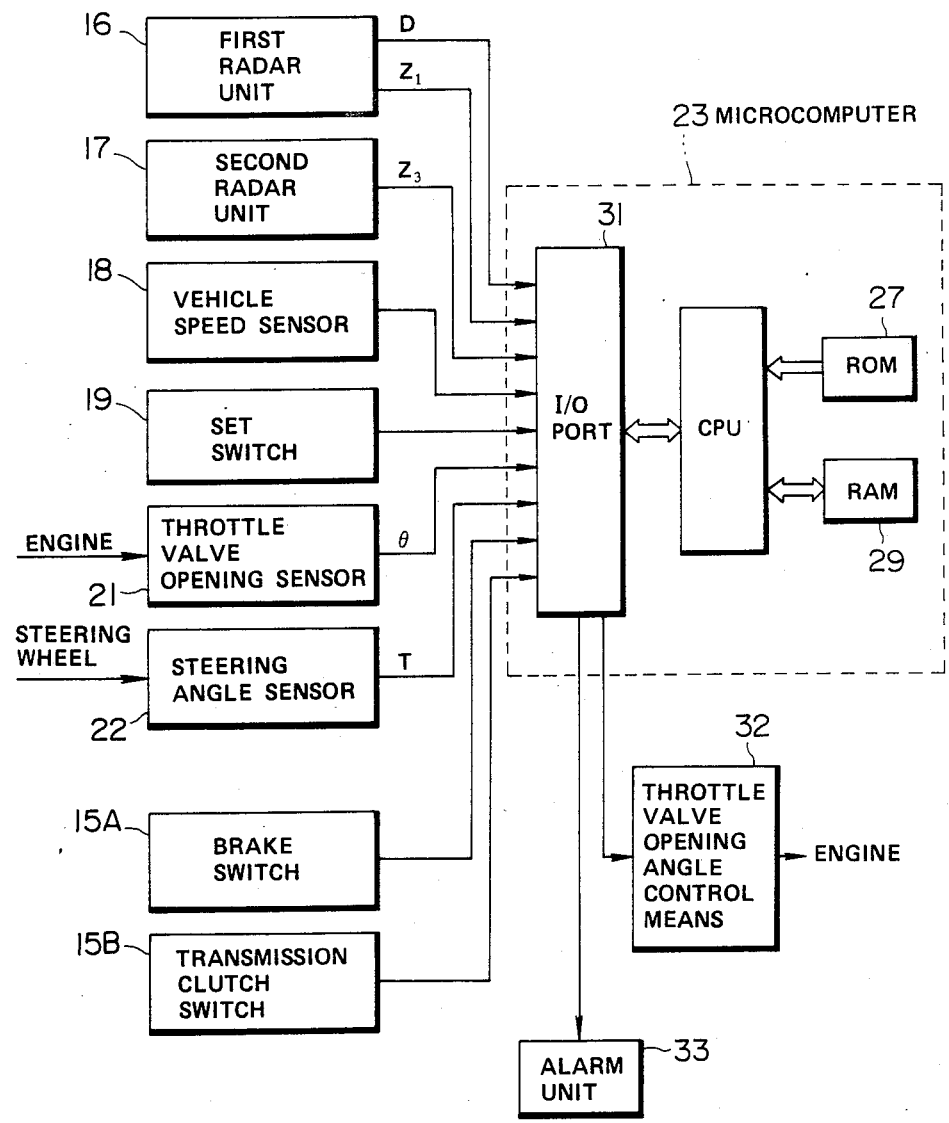
FIG. 1 is a simplified block diagram of a preferred embodiment of a system for controlling a vehicle speed according to the present invention.

FIG. 1 shows a preferred embodiment of the present invention.

The system shown in FIG. 1 generally comprises: first and second radar units 16, 17; vehicle speed sensor 18; a set switch 19 for starting a vehicle speed control; a throttle valve opening angle sensor 21; a steering angle sensor 22 for detecting a steering angle of a vehicle's steering wheel; a brake switch 15A; a transmission clutch switch 15B; an alarm unit 33; and a microcomputer 23 for controlling a vehicle speed through a change in an opening angle of a throttle valve of an engine (not shown) through throttle valve opening angle control means 32 in accordance with a processing result of a flowchart to be described later.

It should be noted that the microcomputer 23 comprises a Central Processing Unit (CPU), a Read-Only Memory (ROM), a Random Access Memory (RAM), and an I/O Port 31.

Figure 2:
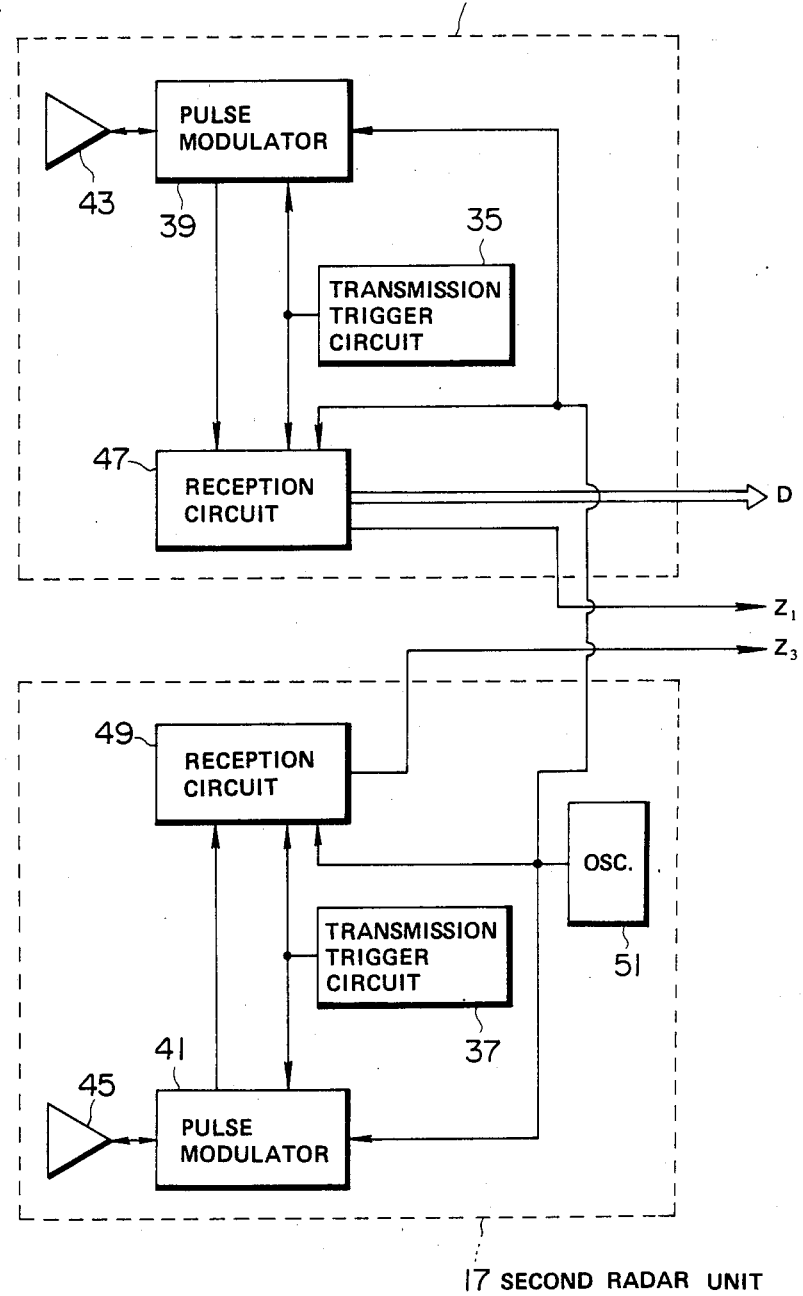
FIG. 2 is a simplified circuit block diagram of two radar units shown in FIG. 1.

The first and second radar units 16, 17 comprise pulse-Doppler type radars as shown in FIG. 2. The first and second radar units 16, 17 comprise: transmission trigger circuits 35, 37; pulse modulators 39, 41; antennae 43, 45; reception circuits 47, 49; and an oscillator 51 common to both radar units 16, 17.

The first radar unit 16 measures a distance D from the vehicle, i.e., the antenna 43 to a reflecting object on the basis of a propagation delay time between times at which an electromagnetic wave such as a light, pulsasive electromagnetic wave having a high frequency, and so on is transmitted and at which the reflected wave is received and outputs a Doppler signal $Z_1$ having a frequency in proportion to a speed component of the reflecting object with respect to the antenna 43. In addition, the second radar unit 17 outputs a Doppler signal $Z_3$ having a speed component of the reflecting object with respect to the antenna 45.

To ensure an accurate detection of an intervehicle distance to the preceding vehicle, the system in this embodiment determines the presence of the preceding vehicle which is moving on the same traffic lane from among reflecting objects monitored by the first and second radar units.

The following is a detailed description of a theory of detection on a vehicle traffic lane of a road.

The same applicant has filed a Japanese patent application Ser. No. Sho 57-190,007 filed on Oct. 30, 1982, the title of which is an apparatus for preventing a collision, (this Japanese Patent Application has already been opened to the public as Japanese patent application Unexamined Open No. Sho 59-79,874 published on May 9, 1984). In the above-identified Japanese Patent Application, a phase difference between the Doppler signals derived from the two radar units for a reflecting object with respect to their antennae is differentiated using the distance value between the vehicle and the reflecting object and a magnitude of the differentiated phase difference is used to determine that there is a probability that the vehicle will collide with the reflecting object.

A detailed description of a theory of the determination of the probability of collision will be made below.

Figure 3:
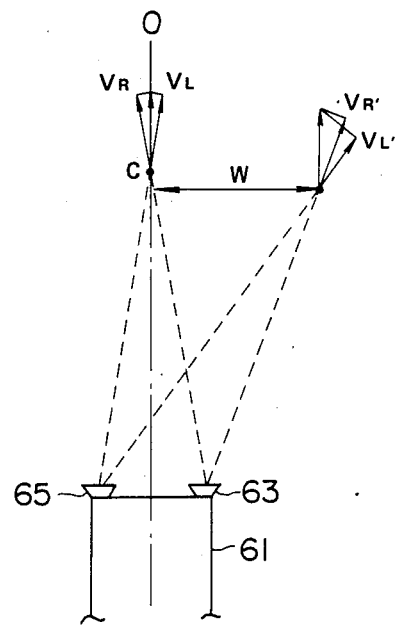

As shown in FIG. 3, the vehicle 61 is provided with a pair of antennae 63, 65 of the two radar units at a front end of the vehicle 61.

The differentiated value of the phase difference becomes large as a deviation of the reflecting object from a hyperbola depicted with the locations of two antennae 63, 65 as two fixed points becomes large, in other words, in proportion to a vertical deflection (offset valve W) of the reflecting object with respect to a center axis 0 which accords with the vehicle movement direction. The system disclosed in the above-identified document utilizes the above-described theory to determine that there is little possibility of collision of the vehicle against the reflecting object when the differentiated value of the phase difference exceeds a predetermined reference value and that there is a danger for the vehicle to collide with the reflecting object when the value of the phase difference does not exceed the reference value.

Suppose that the reflecting object is placed on the center axis 0 of the vehicle 61 as indicated by symbol C in FIG. 3. In this case, the phase difference between two Doppler signals $V_R$, $V_L$ is substantially zero so that the differentiated value of the phase difference is accordingly substantially zero (minimized). If such the differentiated value of the phase difference becomes large in proportion to the offset value W e.g. the offset value W exceeds 1.8 meters it indicates that the reflecting object is another vehicle moving on an adjacent traffic lane of a road supposing that a vertical width for each traffic lane is usually 3.5 meters and the vehicle 61 is moving substantially on a center portion of a traffic lane.

Therefore, the determination of the traffic lane on which the other vehicle moves can be carried out by the comparison of the differentiated value of the phase difference based on the measured result with the reference value for determining the traffic lane since the differentiated phase difference value corresponding to 1.8 meters is determined as the reference value.

To carry out the other vehicle's traffic lane determination on the basis of the above-described theory, the above-described reference valuese ($a_i$, $b_i$, $c_i$) with respect to the respective distances D from the vehicle 61 to the reflecting object with radius of curvature as a parameter are previously stored in a memory, e.g., as shown in FIG. 4. The other vehicle moving on the same traffic lane is referred to as a preceding vehicle hereinbelow.

Figure 5:
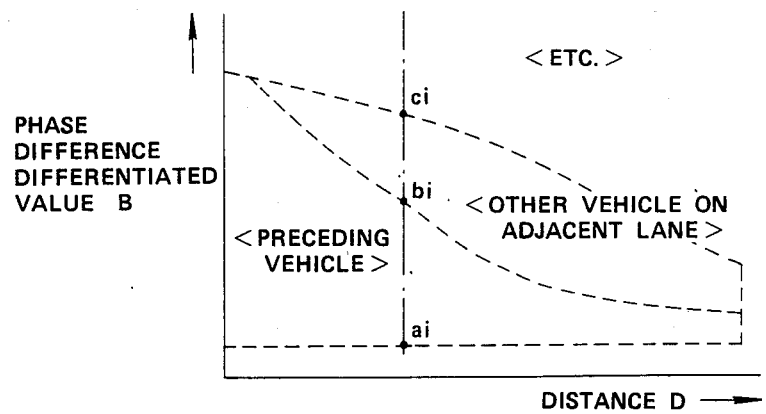

As shown in FIG. 5, $a_i$ denotes a lower limit value of the differentiated phase difference value B until which the system can determine the presence of the preceding vehicle (on the same traffic lane), $b_i$ denotes an upper limit value of the differentiated phase difference value B until which the system can determine the presence of the preceding vehicle (on the same traffic lane) and a lower limit value of the differentiated phase difference value B until which the system can determine the presence of another vehicle (on an adjacent traffic lane), and $c_i$ denotes an upper limit value until which the system can determine the presence of the other vehicle (on an adjacent traffic lane).

The determination on which the traffic lane such other vehicle moves can be carried out by the comparison of the differentiated phase difference value derived from the measured result of the two radar units 16, 17 with each of the three reference values ($a_i$, $b_i$, $c_i$) shown in FIG. 4.

For example, suppose that the distance D to the reflecting object (forwarding vehicle) detected by means of the first radar unit 16 is 52 meters on a straight road (radius of curvature is infinite) and the differentiated phase difference value based on the measurement result of the first and second radar units 16, 17 is B, the result of determination on the forwarding vehicle is described in the following Table 1.

TABLE 1

| Condition | Determination Result |
|---|---|
| $a_i \leq B \leq b_i$ (0) (14) | Preceding Vehicle (moving on the same traffic lane) |
| $b_i < B < c_i$ (14) (16) | Forwarding Vehicle (moving on an adjacent lane) |
| $B < a_i$ or $B > c_i$ | Etc. |

TABLE 1-continued

| Condition | Determination Result |
|---|---|
| (0) | (16) |

In the Table 1, the determination result of Etc. denotes a case in which a forwarding vehicle moving in front of the vehicle 61 is changing its traffic lane, either of the radar units 16, 17 fails, or a plurality of other forwarding vehicles are intersecting at a front detection area, e.g., at an intersection. Such a case of Etc. is not appropriate for the vehicle to continue to follow automatically the preceding vehicle.

Figure 6:
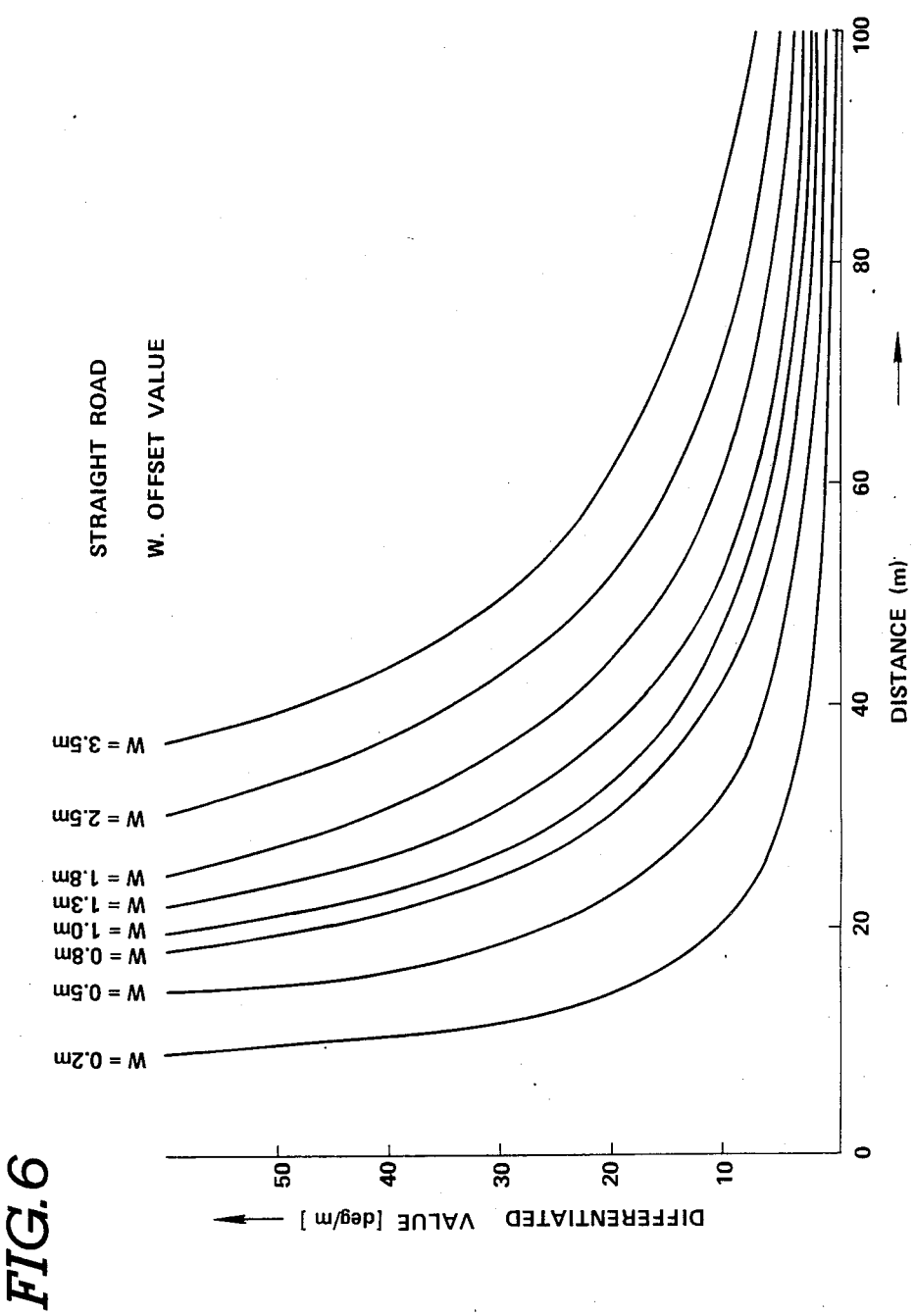
Figure 7:
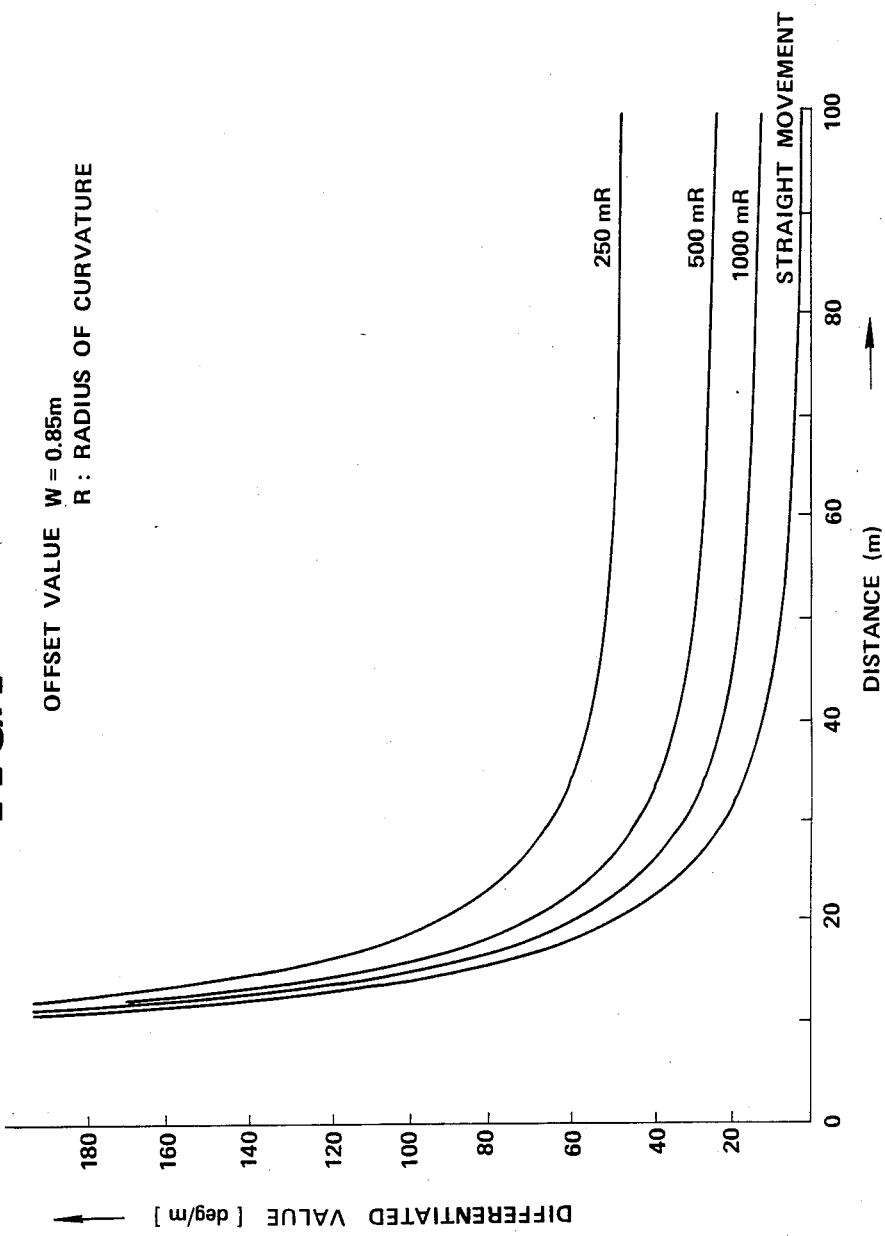

It should be noted that when the reference values ($a_i$, $b_i$, $c_i$) shown in FIG. 4 are set, data plotted in graphs derived from actual experiments need to be used, such as shown in FIGS. 6 and 7.

FIG. 6 exemplifies the change in the differentiated value of the phase difference with respect to the distance with the offset value W being as a parameter in a case when the radius of curvature of the road is infinite (i.e., when the vehicle 61 moves on the straight traffic lane).

FIG. 7 exemplifies the change in the differentiated value of the phase difference with respect to the distance with the offset value w being constant and the radius of curvature R being the parameter. Actually, if a horizontal shape of a laser beam transmitted from each radar unit 16, 17 is substantially sector, the reflecting object (including the preceding vehicle and the forwarding vehicle moving on the adjacent lane) can be detected when a condition denotes by the solid lines in FIG. 6 is established.

Next, an operation of the preferred embodiment will be described below with reference to each flowchart of the microcomputer 23 shown in FIG. 8 through FIG. 10.

Figure 8:
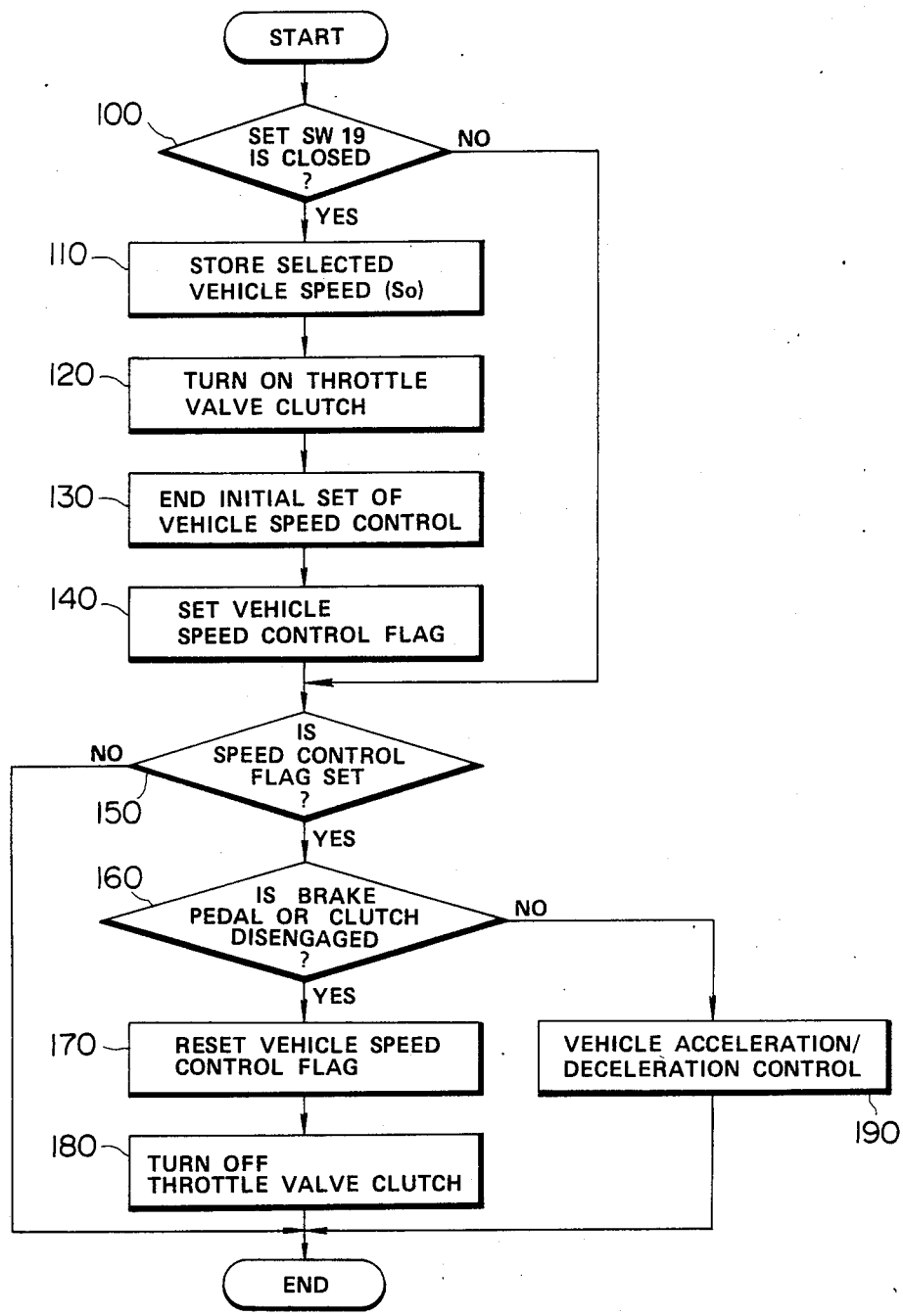
FIG. 8 is a general operational flowchart of the whole system shown in FIG. 1.
Figure 9:
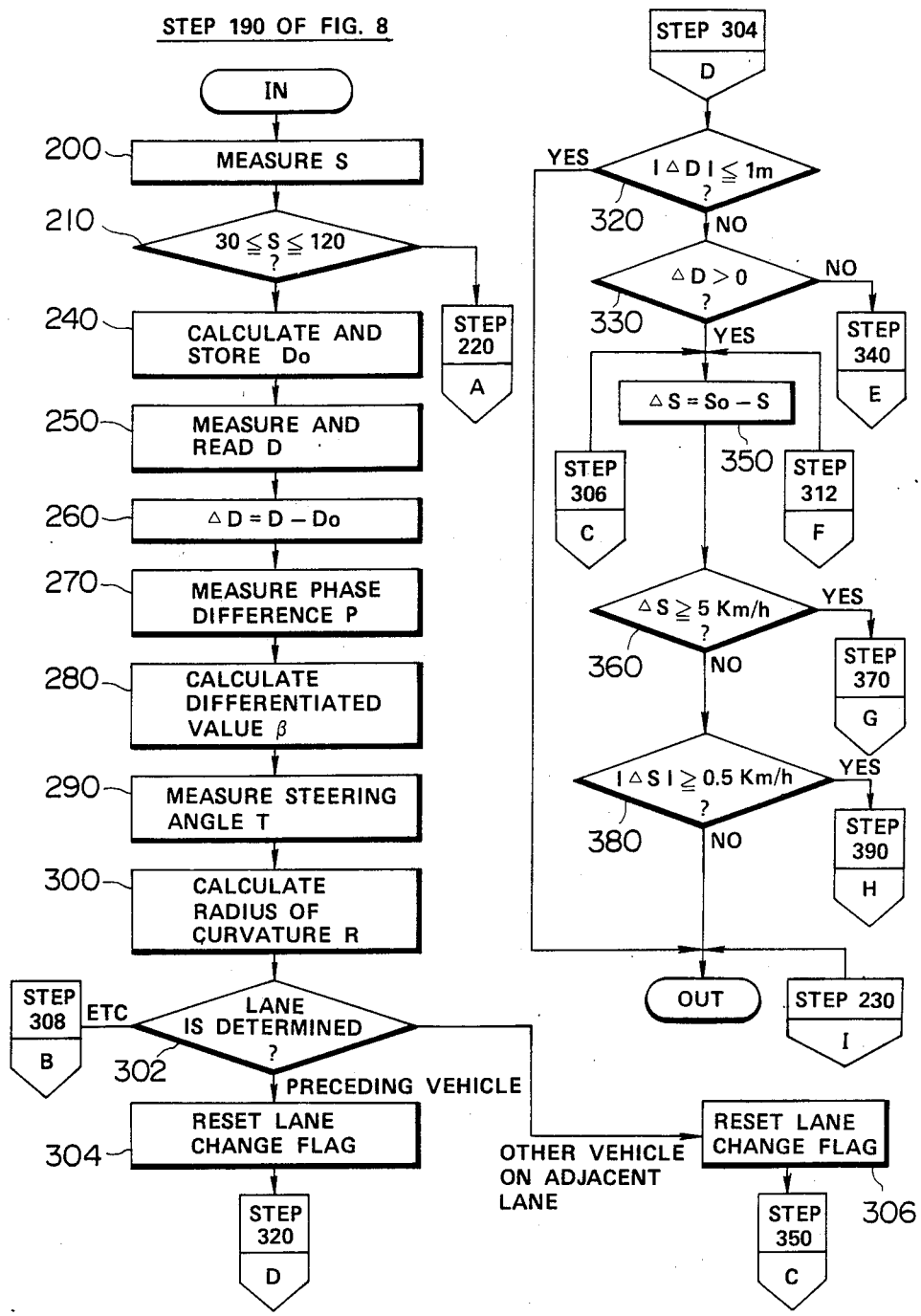
FIGS. 9(A) and 9(B) are integrally a detailed operational flowchart in a step 190 shown in FIG. 8 of the system shown in FIG. 1.
Figure 9:
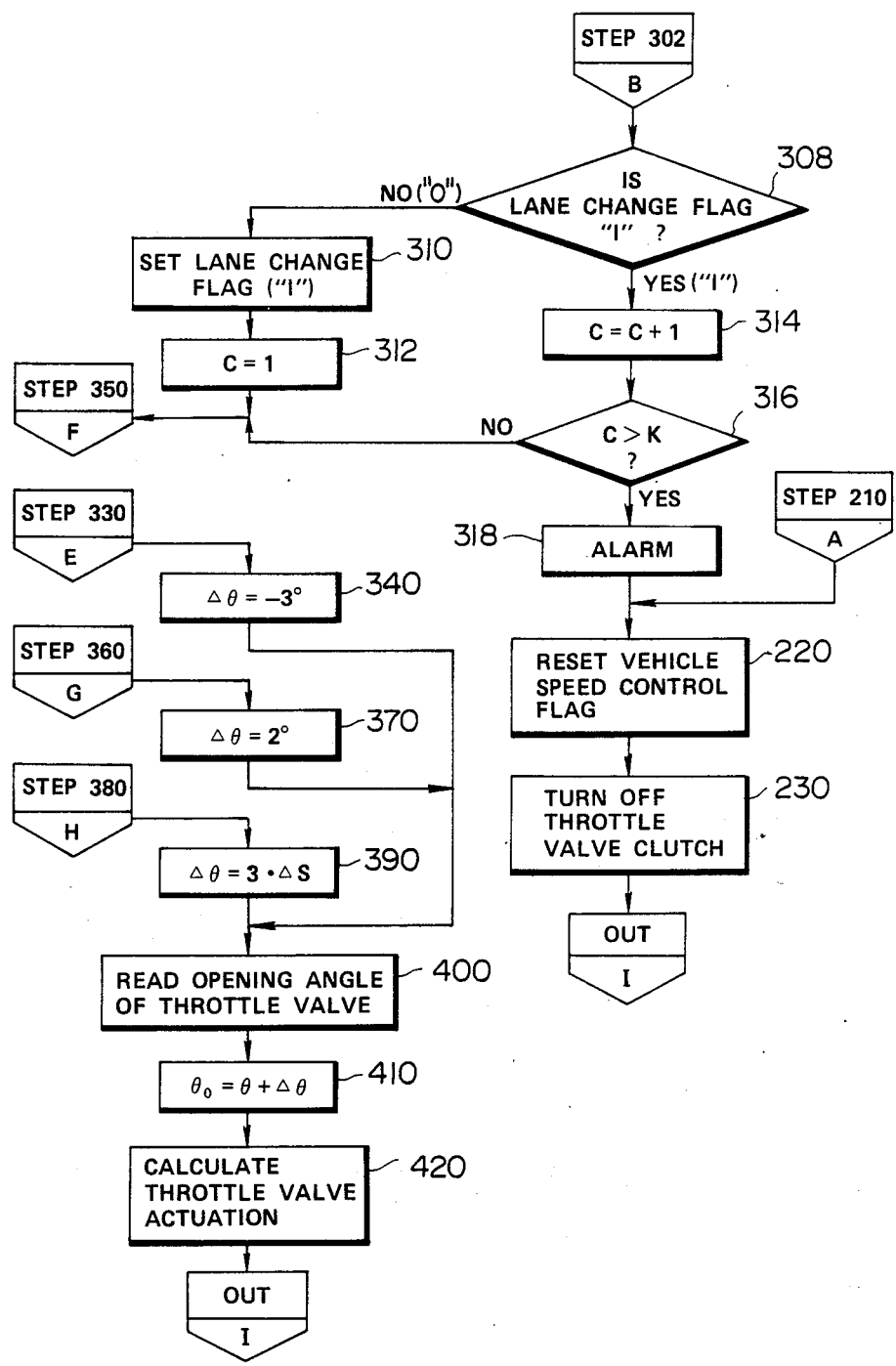

It should be noted that such processings as shown in FIGS. 8 through 10 are started in response to an interrupt signal having a constant period during the vehicle run.

In FIG. 8, the microcomputer 23 determines whether the set switch 19 shown in FIG. 1 is operated in a step 100. If the set switch 19 is not operated in the step 100, the routine ends via a step 150 since the vehicle speed control by the system shown in FIG. 1 is not carried out. If the set switch 19 is operated in the step 100 and the operation of the set switch 19 is first determined in the current interrupt processing, the vehicle speed at this time is stored as a set vehicle speed $S_o$ for carrying out a constant cruising speed control in the case of no presence of the preceding vehicle in a step 110, a throttle valve clutch (not shown) of the throttle valve opening angle control means 32 is turned on in a step 120, an initial setting of the vehicle speed control is carried out in a step 130, wherein an opening angle of a throttle valve is adjusted to an angle $\theta_{so}$ corresponding to the set vehicle speed $S_o$, and a flag indicating that the set switch 19 is operated is set in a step 140. The above-described throttle valve clutch is provided for engaging an output part of the throttle valve opening angle controlling means 32 with a connecting rod (not shown) which changes an opening angle of the engine throttle valve irrespectively of the vehicle's accelerator pedal so that the vehicle speed can be maintained at the set vehicle speed.

The microcomputer 23 carries out an acceleration/deceleration rate control in a step 190 after confirmation that the vehicle speed control is carried out in the step 150 and that a brake is not operated (, e.g., a brake pedal is depressed) from the brake switch 15A in FIG. 1 and a transmission clutch associated with the engine for transmitting an output power of the engine to the vehicle's wheels is not in an off state from the clutch switch 15B in FIG. 1 in a step 160.

If the microcomputer 23 detects that the brake is operated and/or the clutch is in the off state in the step 160, the above-described flag is reset and the throttle valve clutch associated with the connecting rod is turned off in a step 180. Consequently, the present interrupt processing is ended.

The above-described interrupt processing shown in FIG. 8 is exemplified by Japanese Patent Application Unexamined Open No. Sho 55-86,000 published on June 28, 1980 except the content of the step 190.

In addition, the detailed structure of the throttle valve opening angle control means 32 shown in FIG. 1 is exemplified by Japanese Patent Application Unexamined Open No. Sho 56-10,044.

FIGS. 9(A) and 9(B) show integrally a detailed operational flowchart of the contents of the step 190 shown in FIG. 8.

In a step 210, the microcomputer 23 confirms that the current vehicle speed S is within a predetermined range (, i.e., from 30 kilometers to 120 kilometers (30 km/h ≦ S ≦ 120 km/h)).

In a step 240, the microcomputer 23 calculates a safe intervehicle distance $D_o$ according to the current vehicle speed S. It should be noted that if S < 30 km/h or S > 120 km/h in the step 210, the routine goes to a step 220, wherein the above-described flag is reset, and to a step 230, wherein the clutch in the throttle valve opening angle control means 32 is turned off. Consequently, the vehicle speed control is halted.

In a step 250, the microcomputer 23 reads the distance D to the reflecting object detected by, e.g., the first radar unit 16. In a step 260, the microcomputer 23 calculates the difference in distance $\Delta D$ between the distance D and safe intervehicle distance $D_o$. To determine whether the reflecting object is the preceding vehicle, the routine goes to a step 270, wherein the microcomputer 23 reads both Doppler signals $Z_1$ and $Z_3$ from both first and second radar units 16, 17 to calculate the phase difference P. In a step 280, the microcomputer 23 calculates the differentiated value B of the phase difference P.

In the next step 290, the microcomputer 23 reads a steering angle T detected by the steering angle sensor 22. The structure of the steering angle sensor 22 is exemplified by U.S. Pat. No. 4,450,438 issued on May 22, 1984, the contents of which is hereby incorporated by reference. After the calculation of the radius of curvature R of the lane on which the vehicle moves in a step 300, the routine goes to a step 302 in order to determine the traffic lane on which the above-identified reflecting object is present on the basis of the calculated radius of curvature R.

It should be noted that the calculation of the radius of curvature R on the basis of the read steering angle T in the step 300 is executed in the following equation.

$$R = L \times H \times (1 + F \times S^2)/T \qquad (1)$$

wherein L denotes a wheel base determined by the vehicle used, F denotes a stability factor determined by the vehicle used, and H denotes a steering gear ratio determined by the vehicle used.

The above equation (1) is disclosed in Japanese Publication named Shinpen Jidosha Kogaku Binran (Newly-edited Manual of Automotive Engineering) Volume 2 of page 2-43 published on Jun. 20, 1983.

In addition, the differentiated phase difference value B may alternatively be calculated using the phase difference P' and distance D' derived from the previous interrupt processing.

$$B = \frac{\partial P}{\partial D} \approx \frac{P - P'}{D - D'}$$

In a step 302, the microcomputer determines whether the reflecting object is the preceding vehicle from the traffic lane on which the reflecting object is present. The presence of the reflecting object on any traffic lane is determined by comparing the calculated distance D, phase difference differentiated value B, and radius of curvature R, with data previously stored in the ROM 27 in the form shown in FIG. 4 using, e.g., a table lookup technique.

Consequently, if the microcomputer 23 determines that the reflecting object is the preceding vehicle, i.e., the forwarding vehicle which is moving on the same traffic lane as the vehicle 61, the routine goes to a step 304, wherein another flag indicating the microcomputer 23 can determine neither that the reflecting object is the preceding vehicle nor that it is another vehicle moving on an adjacent lane (hereinafter referred to as a lane change flag) is reset. Thereafter, the routine goes to a step 320 in order to perform an intervehicle distance control associated with the determined preceding vehicle so as to maintain the vehicle at a safe intervehicle distance to the preceding vehicle.

Furthermore, in a case when the microcomputer 23 determines that the reflecting object is a forwarding vehicle moving on an adjacent lane to the lane on which the vehicle moves, the routine goes to a step 306, wherein the lane change flag is reset. Thereafter, the routine goes to a step 350, wherein the vehicle speed is maintained at the set vehicle speed So.

On the other hand, in a case when the microcomputer 23 can determine neither that the reflecting object is the preceding vehicle nor that it is the other vehicle moving on the different lane (such a case corresponds to "Etc." of Table 1), the routine goes to a step 308 in order to determine the cause of such unclear determination since there is a doubt of an inappropriate condition to continue to operate to follow automatically the preceding vehicle.

In the step 308, the microcomputer 23 determines whether the lane change flag is set or reset. If the lane change flag is set, a register C for indicating a duration during which the lane change flag is set is incremented by one (C=C+1) in a step 14 since the microcomputer 23 cannot determine the above-described conditions any more (, i.e., the microcomputer 23 has already determined that the condition corresponds to the above-described "Etc.") at least before the present interrupt processing. Thereafter, the routine goes to a step 316, wherein the microcomputer 23 compares the value of the register C with a set value K derived from a given time (several seconds) required for the lane change of the other vehicle divided by the interrupt time of the execution of the flowchart shown in FIGS. 9(A) and 9(B).

If C>K in the step 316, the routine goes to steps 318 and 220, wherein the flag indicating that the vehicle speed control is carried out is reset with an alarm produced through an alarm unit 33 shown in FIG. 1.

That is to say, an actual situation corresponding to the case of "Etc." is usually considered as such a case that the other vehicle moving in front of the vehicle is changing the traffic lane and the time required for the lane change is about several seconds. Therefore, if the duration for which the "Etc." continues is longer than a predetermined time. the condition that the microcomputer determines the case of "Etc." is not derived from the change of the traffic lane but derived from occurrence of the abnormality in either or both of the radar units or a plurality of other vehicles being intersected across the front detection area. In this way, the microcomputer 23 determines that it is now inappropriate for automatically following the preceding vehicle. If C≦K in the step 316, the routine goes to the step 350 to cruise the vehicle at the set vehicle speed So. In addition, if the lane change flag is reset in the step 308, the lane change flag is set in a step 310 and the register C is set to an initial value of "1". Thereafter, the routine goes to a step 350.

On the other hand, in a step 320, an absolute value of a difference ΔD between the safe intervehicle distance Do derived from the step 260 and the current intervehicle distance Dn is compared with a predetermined value, e.g., one meter. If |ΔD|>1 m in the step 320 (NO) and the value of ΔD is negative in a step 330, the routine goes to a step 340, wherein a deceleration rate Δθ is set to a predetermined value to reduce the vehicle speed S at a constant decleration rate corresponding to a decrease of the current throttle valve opening angle (, e.g., −3°, i.e., an area of symbol A shown in FIG. 11) since the vehicle is approaching the detected preceding vehicle at the intervehicle distance below (Do−1 m).

On the other hand, if ΔD>0 in the step 330, i.e., the value of ΔD is positive, the routine goes to a step 350 wherein the microcomputer 23 calculates the difference ΔS between the vehicle speed S and set vehicle speed So (speed deviation). In the next step 360, the microcomputer 23 determines if ΔS is equal to or more than a predetermined speed value (, e.g., 5 km/h). If ΔS≦5 km/h, the routine goes to a step 370, wherein the vehicle speed S is increased at a constant acceleration rate Δθ corresponding to an increase of the throttle valve opening angle of, e.g., 2° (an area of B shown in FIG. 11) since the intervehicle distance to the preceding vehicle is above (Do+1 m) and the vehicle speed S is constant and 5 km/h above the set vehicle speed So. If ΔS<5 km/h and an absolute value of ΔS is equal to or more than another predetermined speed value of, e.g., 0.5 km/h in the step 360 and in the next step 380, the routine goes to a step 390, i.e., the intervehicle distance to the preceding vehicle is (Do+1 m) and the speed deviation ΔS is within a range from 0.5 km/h to 5 km/h (0.5 km/h≦ΔS≦5 km/h), the routine goes to a step 390, wherein the microcomputer 23 calculates a value proportional to the speed deviation ΔS (, e.g., 3ΔS, an area of C shown in FIG. 11) (Δθ=3×ΔS) as the acceleration rate value Δθ and the routine goes to a step 400.

If |ΔD|≦1 m in the step 320 and |ΔS|<0.5 km/h in the step 380 the routine ends since the intervehicle distance to the preceding vehicle is within a range of Do+1 m and the vehicle speed S is within a range of the constant speed width (0.5 km/h).

On the other hand, in the step 400, the microcomputer 23 reads the current opening angle θ of the throttle valve from the sensor 21 shown in FIG. 1 in order to control vehicle speed S at the acceleration or deceleration rate $\Delta\theta$ derived from any one of the steps 340, 370, and 390.

In a step 410, the microcomputer 23 calculates a target opening angle $\theta$o from the current opening angle $\theta$ read in the step 400 in the following equation: $\theta\mathrm{o}=\theta+\Delta\theta$.

Thereafter, the routine goes to a step 420, wherein the opening angle of the throttle valve is adjusted to provide the target angle $\theta$o calculated in the step 410.

The contents of the step 420 will be described in details below with reference to FIG. 11.

In a step 500, the microcomputer 23 checks to see if $\Delta\theta>0$. Depending on whether the rate $\Delta\theta$ is for the vehicle acceleration (positive) or decleration (negative), a motor for rotating positively or negatively the above-described connecting rod is driven to rotate positively to open the throttle valve toward a full-open position or to rotate negatively to close the throttle valve toward a full-close position (steps 510, 520). In this way, if the opening angle $\theta$ of the throttle valve is below a constant angle $\theta_T$ with respect to the target angle $\theta$o in step 530, 540, the microcomputer 23 stops the motor and the interrupt processing routine shown in FIGS. 9(A), 9(B), and 10 ends. The steps 500 through 550 shown in FIG. 10 are also exemplified by Japanese Patent Application Unexamined Open No. Sho 55-86,000 published on June 28, 1980.

As described above, in a system and method for controlling a vehicle speed to automatically follow a preceding vehicle according to the present invention, a pair of radar units are installed on the vehicle 61, a distance to a wave reflecting object is measured on the basis of an electromagnetic wave radiated toward a vehicle forward movement direction, a pair of Doppler signals derived from the relative movement of the reflecting object to the vehicle is received, and the differentiated value of the phase difference of the Doppler signal with respect to the distance is compared with the reference value corresponding to the distance set according to the radius of curvature of the traffic lane on which the vehicle moves so that the system determines that the reflecting object is the preceding vehicle on the same traffic lane and controls the vehicle speed to follow the preceding vehicle at the safe intervehicle distance, the system can prevent an erroneous vehicle speed control on the basis of the intervehicle distance to another vehicle moving on an adjacent lane to the traffic lane on which the vehicle moves in, for example, a curved road. Consequently, a system having a high reliability can be achieved.

It will be clearly understood by those skilled in the art that description is made in terms of the preferred embodiment and various changes and modification may be made without departing from the scope and spirit of the present invention which is to be defined by the appended claims.

What is claimed is:

1. A system for controlling a vehicle speed, comprising:
   (a) first means for monitoring the presence of an object moving relative to the vehicle, measuring a distance from the vehicle to the moving object, and outputting Doppler signals having different directivities based on a movement of the moving object relative to the vehicle;
   (b) second means for calculating a change rate of a phase difference between the Doppler signals derived from said first means with respect to the distance measured by said first means;
   (c) third means for determining a radius of curvature of a traffic lane on which the vehicle moves;
   (d) fourth means for determining whether the moving object monitored by said first means is moving on the same traffic lane as the vehicle on the basis of the magnitude of the change rate of the phase difference derived from said second means with respect to a reference value the reference value being associated with the distance measured by said first means and being set according to the radius of curvature of the traffic lane determined by said third means; and
   (e) fifth means for detecting and controlling the vehicle speed so as to follow the moving object on the same traffic lane at a predetermined safe intervehicle distance to the moving object on the basis of the detected vehicle speed and distance detected by said first means when said fourth means determines that the moving object is moving on the same traffic lane.

2. The system according to claim 1, which further comprises (f) sixth means for measuring a steering angle position of the vehicle and wherein said third means determines the radius of curvature of the traffic lane on the basis of the steering angle position derived from said sixth means and vehicle speed derived from said fifth means.

3. The system according to claim 1, wherein said first means comprises a pair of radar units installed at different front ends of the vehicle, each radar unit radiating an electromagnetic wave toward a predetermined range of a movement direction of the vehicle, receiving the electromagnetic wave radiated and reflected on the moving object present in the predetermined range, and outputting the corresponding Doppler signal based on a movement of the moving object relative to the vehicle and the distance to the moving object being measured by at least one of said radar units.

4. The system according to claim 1, wherein said second means differentiates the phase difference between the Doppler signals derived from said first means with respect to the distance measured by said first means.

5. The system according to claim 1, wherein said second means calculates the change rate of the phase difference between the Doppler signals with respect to the distance from each difference between the current phase difference value and preceding phase difference value before a predetermined time.

6. The system according to claim 1, wherein said fifth means adjusts an opening angle of the throttle valve on the basis of the detected vehicle speed and distance to the moving object so that the distance to the moving object approaches the predetermined safe intervehicle distance.

7. The system according to claim 1, which further comprises a set switch connected to said fifth wherein said predetermined intervehicle distance is set according to the vehicle speed when said set switch is operated.

8. The system according to claim 1, wherein said fourth means determines that the moving object moving on the same traffic lane when the change rate of the phase difference calculated by said second means is below the reference value and above a second reference value.

9. The system according to claim 8, wherein said fourth means determines that the moving object moving on a different traffic lane when the change rate of the phase difference is above the reference value but below a third reference value.

10. The system according to claim 9, which further comprises alarm means and means for detecting a failure in said first means and producing an alarm through said alarm means when said fourth means determines that the change rate of the phase difference above the third reference value continues for a time longer than a predetermined time.

11. A method for controlling a vehicle speed comprising the steps of:
   (a) monitoring the presence of an object moving relative to the vehicle;
   (b) measuring a distance from the vehicle to the moving object if the moving object is present and outputting at least two different directive Doppler signals based on a movement of the moving object relative to the vehicle;
   (c) determining a radius of curvature of a traffic lane on which the vehicle moves;
   (d) calculating a change rate of a phase difference between the two Doppler signals with respect to the measured distance;
   (e) determining whether the moving object monitored in said step (a) is moving on the same traffic lane as the vehicle on the basis of a magnitude of the change rate of the phase difference with respect to a reference value, the reference value being associated with the distance measured in said step (b) and being set according to the radius of curvature of the traffic lane determined in said step (c);
   (f) detecting the vehicle speed; and
   (g) controlling the vehicle speed so as to follow the moving object at a predetermined safe intervehicle distance to the other vehicle moving on the same traffic lane on the basis of the detected vehicle speed in said step (f) and distance measured in said step (b).

* * * * *